United States Patent [19]
Halbasch

[11] 3,967,407
[45] July 6, 1976

[54] FISHING FLOATER
[76] Inventor: Gerald K. Halbasch, 880 Mandalay Ave., Apartment 729, Clearwater, Fla. 33515
[22] Filed: Apr. 30, 1975
[21] Appl. No.: 573,082

[52] U.S. Cl. .............................................. 43/44.9
[51] Int. Cl.² .................................... A01K 93/00
[58] Field of Search ................... 43/44.9, 44.91

[56] References Cited
UNITED STATES PATENTS

| 1,489,088 | 4/1924 | McMindes | 43/44.9 |
| 2,241,851 | 5/1941 | Gilstrap | 43/44.9 |
| 2,741,067 | 4/1956 | Cox | 43/44.9 |
| 3,019,546 | 2/1962 | Hansen | 43/44.91 |

FOREIGN PATENTS OR APPLICATIONS

| 1,016,053 | 9/1957 | Germany | 43/44.91 |

Primary Examiner—Warner H. Camp
Attorney, Agent, or Firm—Edwin E. Greigg

[57] ABSTRACT

The present invention relates to a bob or float for use with fishing lines and more particularly to a sectional float which is slidingly mounted on a fishing line in a novel manner.

3 Claims, 8 Drawing Figures

U.S. Patent   July 6, 1976   Sheet 1 of 2   3,967,407
FIG.1
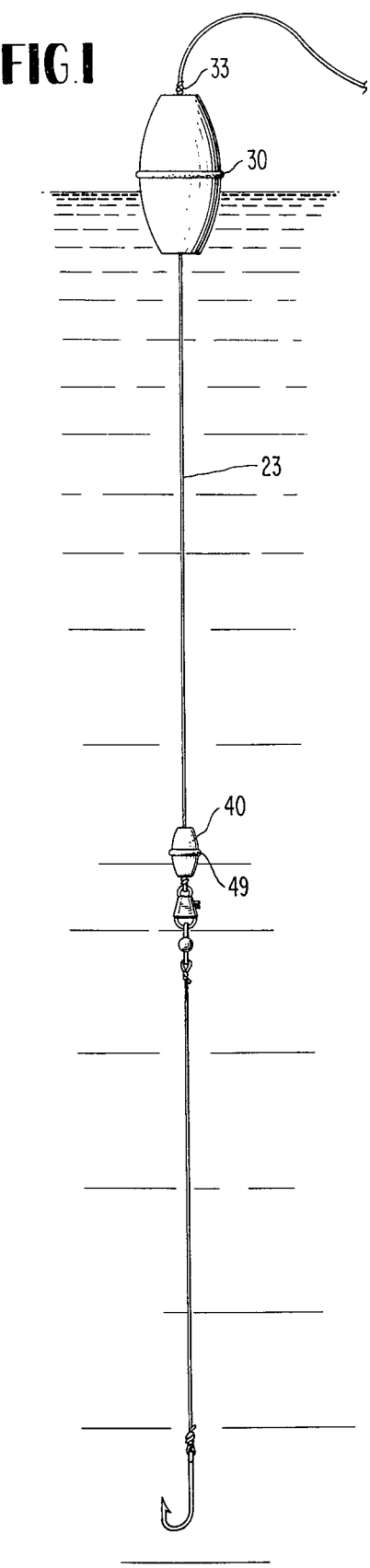
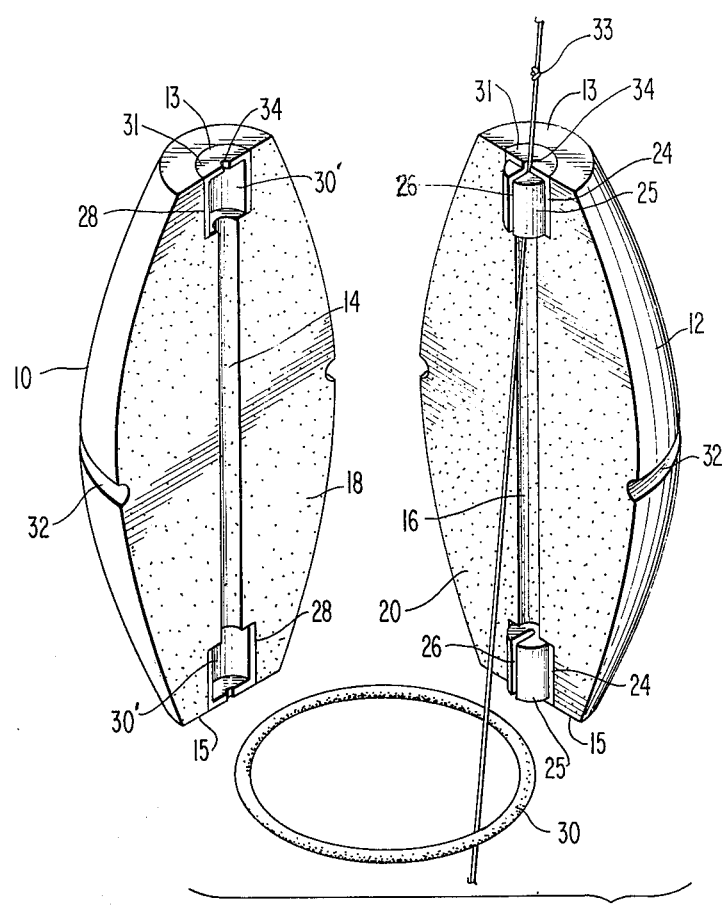
FIG.2
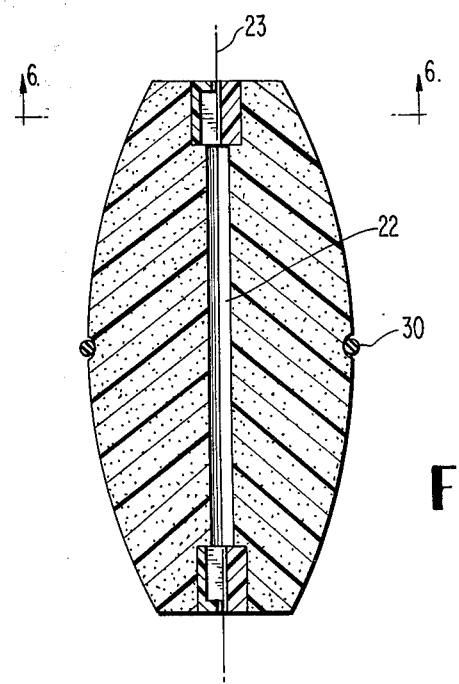
FIG.3

FISHING FLOATER

BACKGROUND OF THE INVENTION

There are many known prior art sinkers and floaters, some of which are clenched or clamped to an angler's fishing line, however, insofar as this system has been used for floaters that would determine the depths of the hook and bait below the surface of the water, they have not been found to be acceptable. In the patent to Freeman U.S. Pat. No. 3,180,051 issued Apr. 27, 1965, there is disclosed a sectional sinker comprising complemental half sections, each half section being provided with semi-circular grooves 20 that extend longitudinally of an ellipsoidal shaped body, the two grooves being interrupted medially of the body by semi-spherical recesses 22 which, when brought into registry with each other, provide a substantially spherical cavity or pocket for a knot in an angler's line so that when the device is fastened together in a suitable manner the sinker is fixed on the fishing line. Also, in the Gregory et al. U.S. Pat. No. 1,240,043 there is also disclosed a fishing line bob which is constructed of two hollow generally ellipsoidal portions and are hinged together at their largest transverse diametrical center. Each section is substantially a counterpart of the other and further includes flat abutting face portions, one of which is provided with a groove and the other half section being provided at opposite ends with recesses that are in alignment with the groove in the other half section, the device being arranged to be snapped around the angler's fishing line.

The patents referred to above are typical of the development in this art and represent between them an expanse of approximately 50 years, however, neither of these structures is available on the market at this time and present day anglers have only available to them a plastic type ball that appears and disappears from the market when other unsuccessful devices make their entry into the market and fail to perform satisfactorily.

OBJECTS AND SUMMARY OF THE INVENTION

The principal object of my invention is to provide a fishing line floater that is very inexpensive and simple to manufacture.

A further object of my invention is to provide a floater, the design of which is so chosen that it will allow the use of a neoprene O ring which is considerably smaller than the largest transverse diameter of the floater and which when placed in an annular groove provides sufficient tension when the O ring is expanded to hold the two halves of the floater firmly together.

A still further object of my invention is to provide a plurality of aligned fishing line guiding means that assure ease of placing the line between the two half-sections of the floater so that it may be locked in slidable arrangement therewith by the O ring that is rolled up the exterior surface of the floater that is essentially an ellipsoid of revolution having truncated end walls and thereafter seated in an annular channel medially of the widest portion of the floater.

Other objects, features and advantages of the present invention will be made apparent from the following detailed description of the preferred embodiments thereof, reference being made to the accompanying drawing.

BRIEF DESCRIPTION OF THE DRAWING

FIG. 1 is a view illustrating a portion of a fishing line showing the floater supporting a fishing hook, beneath a weight in a body of water;

FIG. 2 is an enlarged perspective view of the elements comprising the fishing line guiding means;

FIG. 3 is a cross-sectional view of the assembled elements comprising the floater showing the O ring received in an annular groove and the line guiding means in assembled relation;

DESCRIPTION OF THE INVENTION

Turning first to the view in FIG. 2, the disassembled half-sections, denoted as 10 and 12, which are manufactured from any suitable expandable plastic material, the net density of which is less than that of water, clearly show the semi-circular grooves 14 and 16 which extend longitudinally of the flat surface thereof.

It will be noted that each of the flat walls 18 and 20 of the respective half-sections 10 and 12 when assembled, as shown in FIG. 3, thereby provide a longitudinally extending pathway which will be denoted hereinafter as a first guide means 22 for the fishing line 23.

Inwardly of each of the truncated end walls of one element of the float are positioned second guide means 24—24 each of which are provided with offstanding curvilinear walls 25—25 that are provided medially thereof with slotted portions 26—26 that extend longitudinally of the said one half-section, as shown, thereby providing a continuous uninterrupted path for slidable movement of the fishing line longitudinally of the float.

It will be noted that the other half-section of the float is provided at opposite ends of the flat surface with hemi-cylindrical depressions 28—28 into each depression of which are positioned rigid plastic elements 30'—30' with the curvature of said last named elements being formed complemental to the offstanding curvilinear walls 25—25.

Figure 8:
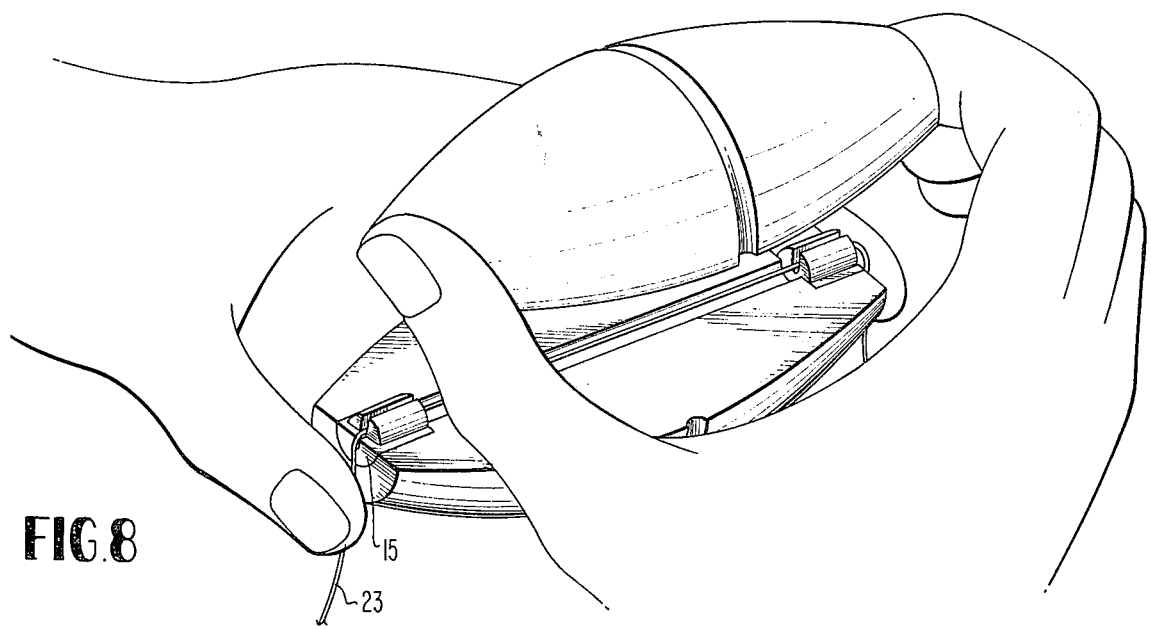
FIG. 8 shows a perspective view of a fisherman's one hand holding the fishing line and one element of the floater between the thumb and forefinger with his other hand prepared to position the other portion of the floater element over the line.

The slotted offstanding walls that are positioned in one of said half-sections described above have a two-fold purpose which now will be explained and reference is made at this time to FIG. 8.

When a fisherman desires to secure the float to his fishing line he will take the half-section 12 thereof which is provided with the secondary guide means 24—24 into one hand and with the other hand place the fishing line 23 through both of the slotted portions 24—24 as shown and while retaining the line taut in the slots by squeezing the line against the truncated end walls 13 and 15 will then place the flat face of the other half-section into sealed engagement with that portion held in the other hand, whereupon the float is now ready to receive the Neoprene O ring 30 which may be rolled up the curved surface by either hand until it falls into the annular channel 32 which extends around the floater medially of the length thereof, all of which is clearly shown in FIGS. 2 and 3.

The floater which is now slidably associated with the fishing line 23 may be arranged to travel upwardly on the line, thus positioning the fish hooks, lures, etc., where desired beneath the surface of the water by securing a knot or stop 33 on the line which frictionally engages the same thereby preventing the upward movement of the floater, note in particular FIG. 1.

Further, reference is made at this time to FIG. 2, where there is clearly shown a further improvement in my floater.

In each truncated end wall 13 and 15, respectively, and flush therewith, is positioned one half of a supplemental fishing line guide means 31—31 with each one-half portion being provided with a dimpled area 34—34, each of said dimples being suitably aligned with the slotted portions 26—26 provided in the second guide means 24—24.

Figure 4:
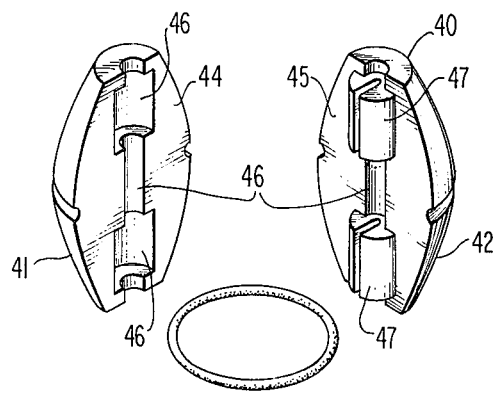
FIG. 4 is an exploded view showing two half-sections of a fishing sinker showing my aligned line guiding means.

Turning now to the exploded view in FIG. 4 it will be observed that the plural elements comprising sinker 40 include two-half-sections 41 and 42 each of which is provided with fishing line guide means 43 the several half-sections having portions that are complementally formed.

Figure 5:
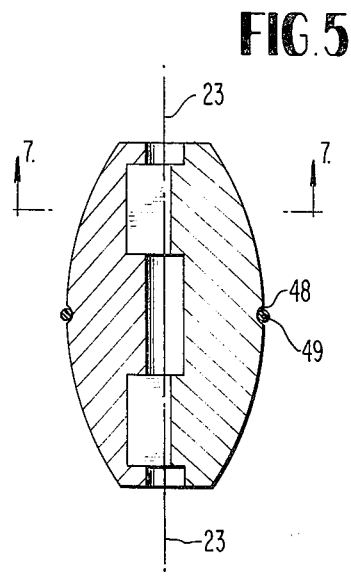
FIG. 5 is a cross-sectional view of the assembled elements comprising my sinker showing the O ring received in an annular groove and the line guiding means in assembled relation.
Figure 6:
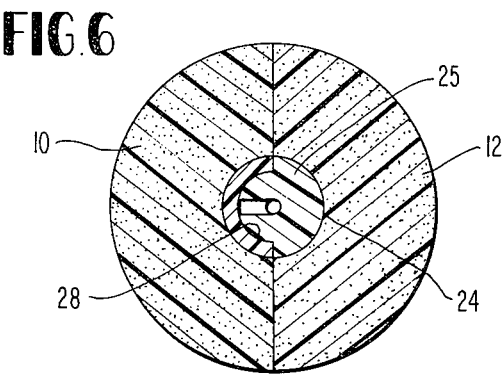
FIG. 6 is a view on line 6—6 of FIG. 3.
Figure 7:
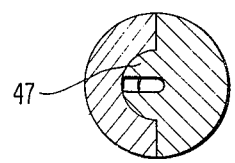
FIG. 7 is a view on line 7—7 of FIG. 5.

It will be seen that as provided in the floater, described earlier herein, there are a pair of flat surfaces 44 and 45, through each of which extends a longitudinal fishing line guiding groove 46 one of said half-sections also being provided with hemi-cylindrical depressions 46—46 that are formed complemental to longitudinally spaced slotted protrusions 47—47 through which the fishing line is arranged to extend, all of which is well shown in FIG. 5.

It will be noted in the view of FIG. 5 that the exterior surface of the sinker is not unlike the floater since it also is arranged with an exterior annular channel 48 the depth of which is adequate to receive the Neoprene O ring 49 and thus securely retain the several half sections of the sinker in juxtaposed relation. As explained earlier herein, the O ring being resilient and each of a size smaller than either the sinker or the floater respectively, they can be rolled about an imaginary axis which extends lengthwise of their cylindrical body and thus are constantly increased in size until they attain a point adjacent to the annular channels whereupon they are snapped thereinto.

What is claimed is:

1. A fishing floater comprising a pair of duplicate half-sections having inwardly disposed flat surfaces each of which are provided with first grooves extending substantially the length thereof and arranged to slidably receive a fishing line, said half-sections further including barrel-like exterior walls having truncated end portions with said barrel-like exterior walls arranged to receive an elastic O-ring to retain the inwardly disposed flat surfaces in juxtaposed relation, said first grooves terminating in recesses provided at opposite ends of each said half-section of said floater, each said recess having a greater depth than said first grooves, with each of said respective recesses in one of said half-sections of said floater receiving secondary line guide means having longitudinally slotted curvilinear walls, the said slotted walls each communicate with dimpled areas in supplemental line guide means provided in the end walls, each recess in said other half-section provided with supplemental line guide means, each said supplemental line guide means in said other half-section having a dimpled area, the curvilinear walls of the first said one half-section being received in complementally formed pockets defined by said recesses in said second half-section and said respective dimpled areas arranged to merge into means defining a smooth uninterrupted means defining an opening in the opposite end walls of said assembled floater.

2. A fishing floater as claimed in claim 1, in which each of the said dimpled areas has a root portion that is coincident with and merges into the slotted walls of the secondary line guide means.

3. A fishing floater as claimed in claim 1, in which the elements comprising the secondary line guiding means positioned at the opposite ends of said one half-section have cylindrical exterior walls.

* * * * *